United States Patent [19]

Green

[11] 4,239,388
[45] Dec. 16, 1980

[54] TIME DOMAIN LASER RECONNAISSANCE TECHNIQUE

[75] Inventor: Leland D. Green, Sierra Madre, Calif.

[73] Assignee: The United States of America as represented by the Secretary of the Air Force, Washington, D.C.

[21] Appl. No.: 494,008

[22] Filed: Jul. 29, 1974

[51] Int. Cl.³ .................. G01C 3/08; H04N 7/00
[52] U.S. Cl. ............................ 356/5; 356/4; 356/371; 358/96; 358/107; 358/108; 358/109
[58] Field of Search ............ 356/4, 5, 120, 371; 178/7.3 D, 7.5 D, 6.8, DIG. 34, DIG. 36; 358/60, 75, 96, 107, 108, 109

[56] References Cited

U.S. PATENT DOCUMENTS

| | | | |
|---|---|---|---|
| 3,395,608 | 8/1968 | Neill | 356/109 |
| 3,527,533 | 9/1970 | Hook et al. | 356/5 |
| 3,533,697 | 10/1970 | Hughes | 356/5 |
| 3,565,528 | 2/1971 | Witte | 356/5 |
| 3,743,418 | 7/1973 | Heflinger | 356/5 |
| 3,790,287 | 2/1974 | Cuthbert et al. | 356/120 |
| 3,879,133 | 4/1975 | Mathieu | 356/169 |
| 3,897,150 | 7/1975 | Bridges et al. | 356/5 |

Primary Examiner—Stephen C. Buczinski
Attorney, Agent, or Firm—Joseph E. Rusz; James S. Shannon

[57] ABSTRACT

Method and apparatus for producing imagery of an object having distinct vertical geometry characteristics located at a reference plane remote from a scanning laser. In particular, a laser beam is utilized to scan objects at the reference plane and the optical signal reflected therefrom, corresponding to the reflectivity of the objects and background, is detected. An electrical signal, corresponding to the detected reflectivity signal, is coupled to an RF amplifier, the output of the RF amplifier being applied to an amplitude demodulator. The output of the amplitude demodulator, corresponding to the reflectivity and vertical geometry characteristics of the object at the reference plane, is applied to a recording device to produce the aforementioned imagery.

1 Claim, 5 Drawing Figures

TIME DOMAIN LASER RECONNAISSANCE TECHNIQUE

The invention herein described was made in the course of or under a contract with the Air Force Avionics Laboratory, Air Force Systems Command, Wright Patterson Air Force Base, Ohio, Contract No. F33615-72-C-1140.

BACKGROUND OF THE INVENTION

Active line scan sensors presently utilized in the prior art make imagery of an object by directing a beam of light generated, for example, by a laser, to the object and sensing the reflected energy. The beam of light is made to scan the object periodically, similar to a flying spot scanner. Resolution of the sensor is determined by the size of the illumination spot on the object, the spot being scanned such that each resolution element on the object is illuminated one at a time. The reflection from each resolution element may be individually recorded on film or other media. The active line scan sensors described are primarily operated from an aircraft, the object being imaged being the ground and targets thereon.

The beam of light, which may be generated form a laser, scans the ground in a direction perpendicular to the path of the aircraft. For each sweep of the sensor, a narrow line equal to the width of the resolution of the sensor is scanned on each side of the aircraft. The motion of the aircraft allows successive adjacent lines to be scanned, the sensor viewing each resolution element as it is illuminated by the laser beam. Part of the optical reflected energy is detected by photodetectors in the sensor, the resulting electrical video signals being amplified, processed and used to control an optical film writing system, such as a strip map.

The reflectivity of an object at a remote reference plane may be utilized for identification purposes. However, many times the reflectivity differences between targets and backgrounds are intentionally made small for purposes of camouflage.

It is therefore desirable to develop techniques which separate the differences between objects (targets) and backgrounds on the basis of other criteria. One possible criteria is the vertical geometry of the objects in question. It is expected that man made objects and natural objects have different vertical geometry characteristics. Man made objects tend to exhibit extremes in vertical geometry, i.e., being flat, having sudden changes in vertical height, or pronounced vertical shapes whereas the vertical geometry of natural objects tends to lie between these extremes. This additional information, when correlated with reflectivity information, would provide a procedure whereby objects can be separated from backgrounds.

SUMMARY OF THE PRESENT INVENTION

The present invention provides method and apparatus for producing imagery of an object having distinct vertical geometry characteristics located at a reference plane remote from a scanning laser. In particular, a laser beam is utilized to scan the reference plane, and the optical signal reflected therefrom, corresponding to the reflectivity of objects at the reference plane, is detected. An electrical signal corresponding to the detected reflecting signal is coupled to an RF amplifier, the output of the RF amplifier being applied to an amplitude demodulator. The output of the amplitude demodulator, corresponding to the reflectivity and vertical geometry characteristics of the object at the reference plane, is applied to a recording device to produce the aforementioned imagery. The scanning laser in the preferred mode is operated as a mode locked laser which provides a light output having high frequency components and phase frequency and phase stability.

It is an object of the present invention to provide method and apparatus for producing imagery of an object having distinct vertical geometry characteristics located at a reference plane remote from a scanning laser.

It is a further object of the present invention to provide method and apparatus for producing a video signal representing the reflectivity of an object having distinct vertical geometry characteristics located at a reference plane remote from a scanning laser.

It is still a further object of the present invention to provide method and apparatus for producing a video signal representing the reflectivity of an object having distinct vertical geometry characteristics located at a reference plane remote from a mode locked scanning laser.

It is a further object of the present invention to provide a laser scanning system which produces a video signal representing the reflectivity of objects and background at a remote reference plane, the video signal being recorded to form an image which enhances the differences between the objects and backgrounds for identification purposes.

DESCRIPTION OF THE DRAWINGS

For a better understanding of the invention as well as other objects and features thereof, reference is made to the following description which is to be read in conjunction with the accompanying drawings wherein.

DESCRIPTION OF THE PREFERRED EMBODIMENT

As will be described in more detail hereinafter, a mode locked laser generates the scanning beam utilized in the preferred embodiment of the present invention. Therefore, a brief description of the mode locked laser is set forth hereinafter.

Since optical cavity resonators (the Fabry-Perot interferometer, for example) utilized to produce laser light output are much larger than the wave length of the signals employed therein, these are inherently multimode devices. Therefore, lasers are capable of simultaneously oscillating at a plurality of bands of frequencies whose nominal center-to-center spacings $f_c$ are given at $c/2L$, where c is the velocity of light and L is effective cavity length. Thus, the output spectrum from an optical laser generally consists of a plurality of spaced, discrete bands of frequencies (longitudinal modes), the amplitude and frequency thereof varying with time in a random fashion. As a consequence, the output from the laser is noisy, being randomly modulated at a frequency given approximately by the separation $f_c$ between adjacent longitudinal modes. If this situation was not corrected, it would materially limit the utility of the laser for certain purposes, such as in object identification as described hereinabove. The stabilization of the amplitude and frequency of the longitudinal modes, however, is achieved by internally modulating the laser in a synchronous frequency. The synchronous frequency, as that term is used in the prior art, defines a frequency within a band of frequencies whose center is nominally given by $nc/2L$ where n is an integer and L is the effective length of the cavity for the mode at the center of the Doppler-broadened gain curve, and whose bandwidth is of the order to $10^{-5}nc/2L$.

The output of the laser, when synchronously modulated, consists of a series of pulses whose repetition rate equals the modulating frequency, i.e., $c/2L$. A more detailed description of mode locking is set forth in U.S. Pat. Nos. 3,412,251 and 3,648,193.

Figure 1:
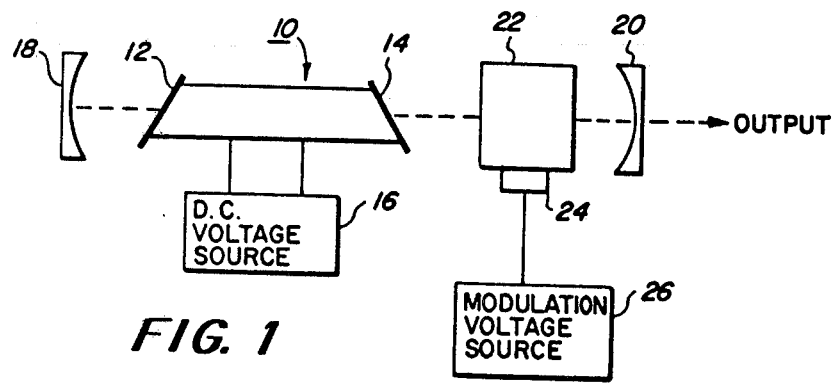
FIG. 1 is a schematic block diagram of a mode locked laser which may be utilized in the present invention.

FIG. 1 illustrates schematically a laser which may be utilized with the present invention. In particular, an argon-ion laser 10 comprises an enclosed, elongated tube having the ends 12 and 14 thereof inclined at the Brewster angle to minimize reflections. D.C. voltage source 16 is connected to the laser electrodes for supplying the power necessary to maintain a gas discharge within tube 10 for establishing a population inversion in the active medium of the laser, in this case argon. It should be noted that other laser active medium may be utilized, such as He-Ne gas lasers and solid state lasers, as well as other techniques for causing population inversion, such as optical pumping. Tube 10 is located within an optical cavity defined by mirrors 18 and 20, one of the mirrors (mirror 20 in the embodiment illustrated) being made partially transmissive such that the desired wave energy can be coupled out of the cavity through the mirror.

Located within the cavity and interposed between end 14 and mirror 20 is an acoustic-modulator 22 which may comprise a fused quartz block. An ultrasonic standing wave is induced in modulator 22 by means of ultrasonic transducer 24 mounted to the cavity wave. Source 26 comprises a tunable radio frequency oscillator which produces a variable frequency sinusodial modulation voltage, the modulation frequency being tuned to the laser intermode frequency $c/2L$ to mode lock the laser. In the particular embodiment illustrated, the frequency signal applied to transducer 24 was approximately 47.2 MHz. The magnitude of the modulation voltage required to produce mode locking can be determined by standard techniques, i.e., the output of the laser can be coupled to an optical scanning interferometer and the voltage coupled to transducer 24 adjusted until the observed laser modes become stable and relatively noise free. The length of the argon laser set forth in FIG. 1 is 62.5 inches long, corresponding to an output pulse repetition rate of 94.4 MHz and mirrors 18 and 20 were dielectric coated peaked for operation at 5145 Å.

It should be noted that non-mode locked lasers can be utilized to generate the scanning light beam of the present invention such as a modulated light source, such as a gallium arsenide solid state laser wherein the input current is modulated appropriately, or an externally modulated laser. The characteristics of the scanning laser light beam which are preferred in the operation of the present invention is that the frequency and phase of the reference waveform remain constant during the time it takes for the transmitted beam to reach the target or ground and return, i.e., the transit time and that the beam should comprise high frequency components and have the capability of being amplitude modulated.

Since a mode locked laser provides high frequency components with precise frequency and phase stability, has the required beam characteristics, and provides an output beam with relatively low power input, it is the preferred laser configuration. The repetition rate of the mode-locked laser is a function of the length of the laser cavity, the phase stability being a function of the modulating source 26. The particular embodiment described hereinafter comprises a mode locked argon-ion laser with a repetition rate of approximately 94.4 MHz and a pulse width of less than 250 picoseconds.

As is well known, the Fourier transform of a pulse train in the time domain in a summation of all harmonics. To obtain the results of the present invention, described in more detail hereinafter, a standard radio frequency (RF) radio receiver was tuned to a preselected harmonic, the receiver comprising a system for detecting the amplitude modulation of the input signal. As the line scan system scans the reference plane and any objects thereat, the power returned to the sensor varies as a function of the reflectivity of the object being scanned. When tuned to the preselected harmonic of the transmitted light beam signal, the radio receiver detects the power received by the sensor at that particular harmonic.

As set forth hereinabove, the mode-locked laser produces a continuous train of very narrow pulses of light. The pulses, which are less than one nanosecond long, have a spatial length of less than one foot. The train of pulses with a repetition rate of 94.4 MHz can thereby be viewed as a train of pulses that are less than one foot in length and are separated by 10.6 feet.

The shape of the pulses of light can be modified by the object being illuminated in certain circumstances. For purposes of illustration, assume that a laser line scan sensor, mounted to an aircraft, had an instantaneous field of view of 0.25 milliradian and was flying at 2000 ft. The size of the illuminated spot on the ground would be about 0.5 feet in diameter. If this spot illuminated a surface that was perpendicular to the sensor, the shape of the pulse of light returning to the sensor would not be modified. However, if the resolution element was incident on a stair step where half of the beam illuminated one of the steps and the other half illuminated an adjacent step, then the shape of the pulse returning to the sensor would be modified because of the difference in path length. The light that was incident on the upper step would be received by the sensor sooner than the light incident on the lower step. If the steps had a difference in height of one foot, the light returning to the sensor would have two pulses whose centers were separated by two nanoseconds (a two foot round trip difference). Since half of the beam hit one step and the other was on the other step, the magnitude of each of the two pulses would be half of the magnitude of the unmodified pulse.

Figure 2A:
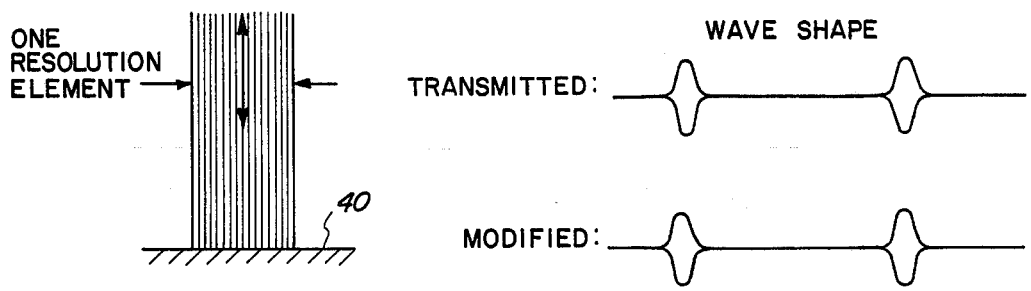
FIGS. 2(a)—2(c) illustrate, in schematical form, the theory of the present invention.
Figure 2B:
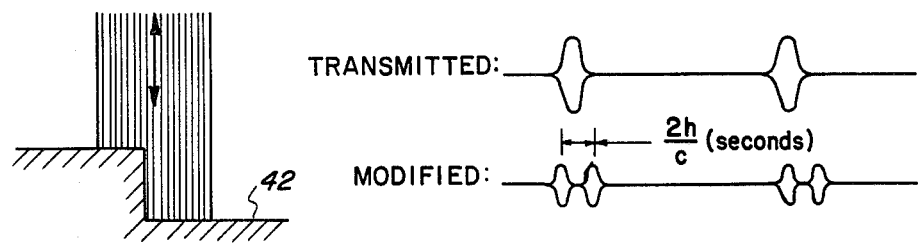
Figure 2C:
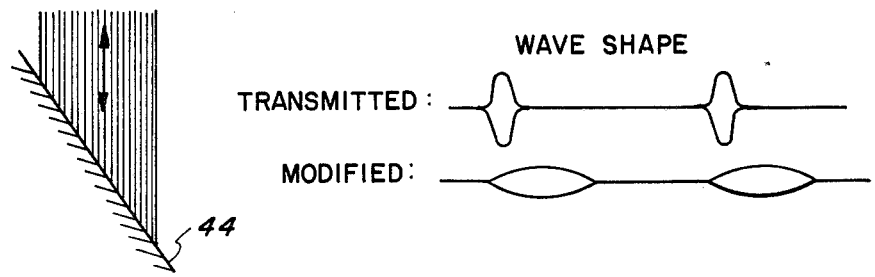

This concept is shown in FIGS. 2(a)—2(c). In FIG. 2(a), the resolution element of the scanning laser beam is incident on an object to which is perpendicular to the laser sensor. For this case, the pulse of light is not modified when it returns to the laser sensor. For the object step 42 shown in FIG. 2(b), the pulse train of single pulses is converted into a pulse train of double pulses, since the transmitted beam is incident as two surfaces that have different ranges to the laser sensor. For the shaped object 44 shown in FIG. 2c wherein the transmitted beam is incident on a surface where the angle of incidence is less than 90°, the pulse train returning to the sensor is a train of single pulses, but the length of the pulse has been modified (the height of the pulse has also been modified due to conservation of energy).

The modification of the pulse of energy therefore provides information about the target scene which is not a function of reflectivity.

The technique that has been used to determine the type and extent of pulse modification is to examine the shape of the returned pulse in the frequency domain. The harmonic content of the returned pulse will be modified when its shape is changed. The changes in the magnitude and phase of the harmonics become the basis for developing new target signature information. By comparing the magnitudes and phase of the harmonics for each object, significant differences can be ascertained.

As the sensor scans the target scene, the amplitudes of the many harmonics of the received signal will be modulated. One or more of these harmonics of the received signal will be modulated and amplified using one or more narrowband R.F. amplifiers. These signals can then be amplitude demodulated to provide a video signal from which imagery can be made. The signals can also be phase demodulated relative to each other to provide additional information.

An important aspect of using a transmitter pulse with high harmonic content is that a significant improvement in the signal to noise ratio can be obtained by using a narrowband R.F. amplifier centered on the harmonic frequency of the received signal rather than utilizing a broad-band amplifier and process the entire signal in the time domain.

It has been determined that the imagery made with higher harmonics provides greater shadow detail of objects than imagery made with lower harmonics.

The technique of the present invention provides advantages in its ability to identify objects having vertical detail.

Figure 3:
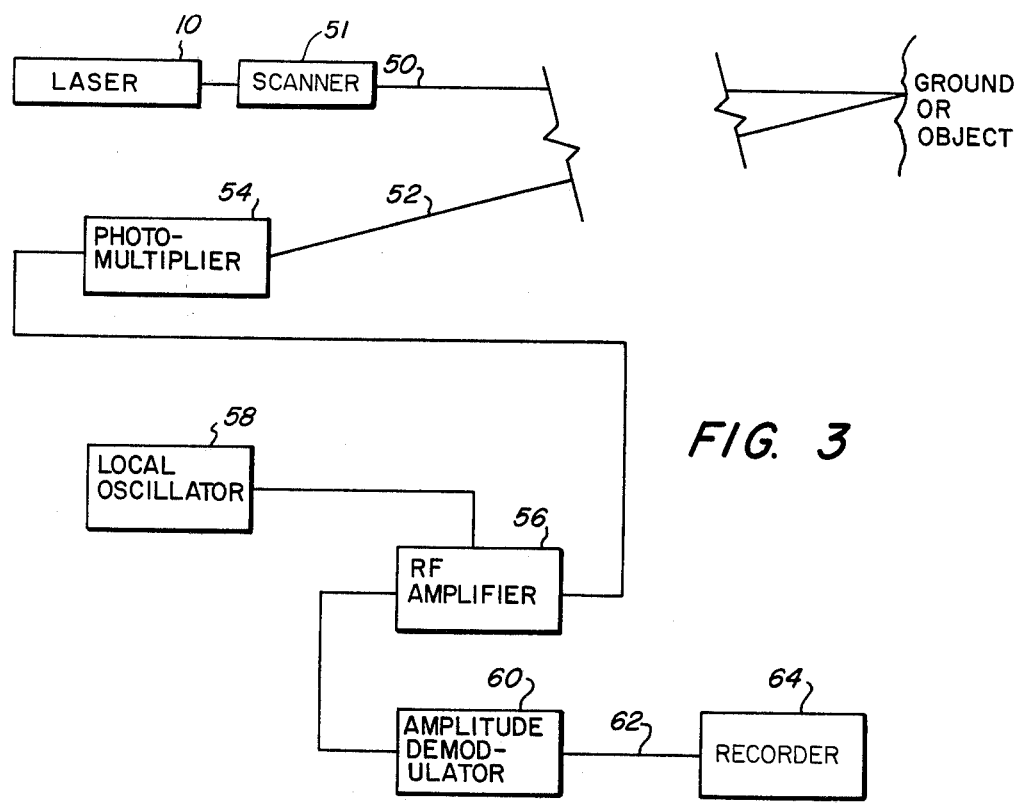
FIG. 3 is a schematic diagram of the apparatus utilized in the present invention.

Referring now to FIG. 3 apparatus for implementing the technique of the present invention is illustrated.

A laser 10, operated in the preferred embodiment as a mode locked laser, described in reference to FIG. 1 hereinabove generates a coherent, amplitude modulated, high frequency pulsed light beam 50. It is to be noted at this point that a mode locked laser is modulated internally. If an alternate source of high frequency laser light is utilized, an acoustic-optic or electro-optic modulator may be utilized to modulate the laser beam.

The transmitted optical laser beam scans the ground or object (the ground or object being scanned in successive increments) by means of scanner 51, which could be a rotating prism as set forth in copending application Ser. No. 494,009 and the reflected optical beam 52 is applied to photodetector 54. In a successful embodiment of the invention, the output of mode locked laser 10 was amplitude modulated at 755 MHz, optical beams 50 and 52 therefore also being aplitude modulated at 755 MHz. As set forth hereinabove, mode locked laser 10 (or other laser configuration) may be adjusted so that alternate harmonics (frequencies) are generated. The output of photodetector 54, current modulated at 755 MHz, is coupled to tuned RF amplifier 56, tuned to the selected harmonic. The output of local oscillator 58 which, for example, may oscillate at 725 MHz, is applied to the other input of tuned RF amplifier 56. The frequency output of tuned RF amplifier 56 corresponding to the difference between the frequency of the signals applied thereto, equals 30 MHz. The output of tuned RF amplifier 56 is applied to an amplitude demodulator 60, the output thereof on lead 62 being displayed on a CRT or used to control an optical film writing system or other recording device 64.

In operation, received signal 52 is detected by separate photodetector 54 in RF amplifier 56. The RF amplifier 56 is tuned to a selected harmonic (frequency of laser 10) and operates to amplify the received signal. RF amplifier 56 is connected to local oscillator 58 and beats with the corresponding input signal to produce an intermediate frequency signal at the output thereof. The received signal, shifted to the intermediate frequency, is coupled to amplitude demodulator 60. A grey scale video signal showing reflectivity of the object, or target, scene and including information relating to the vertical geometry aspects of an object is obtained on lead 62 by amplitude demodulating the 30 MHz output of RF amplifier 56 in amplitude demodulator 60.

The grey scale video, or reflectivity, signal is then applied to recording or display device 64 whereby the imagery can be visually observed.

In the preferred embodiment, the RF amplifier 56 has a tuning range, for example, from 0.1 to 2 GHz which is capable of being tuned to one of the harmonics in the signal generated by laser 10.

The train of very narrow pulses generated by mode locked laser 10 is very high in harmonics. If the laser 10 is modulated at a frequency of 94.4 MHz, for example, 24 or more harmonics may be generated simultaneously.

The technique of the present invention provides advantages in its ability to identify flat objects, show differences between types of foliage and produces dark outlines around objects that are spaced above the ground.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt to particular situations or material to the teaching of the invention without departing from its essential teachings.

What is claimed is:

1. Apparatus for producing a video signal representing the reflectivity of a surface remote from the source of a scanning light beam, said surface having vertical details, comprising:
    a mode-locked laser for generating a pulsed light beam having a predetermined repetition rate and high harmonic content,
    means for transmitting said pulsed light beam to said remote surface, said transmitting means causing said pulsed light beam to successively scan portions of said remote surface,
    a photodetector for receiving the light beam reflected from said scanned surface and generating an electrical signal in response thereto, the repetition rate and phase of said pulsed light beam being substantially constant during the time said light beam is generated and thereafter received by said photodetector, said electrical signal having an amplitude corresponding to the reflectivity and vertical geometry of the surface scanned by said pulsed light beam,
    a local oscillator, a narrow band RF amplifier, tuned to a harmonic of the pulse repetition rate of said laser, having one input coupled to said photodetector and a second input coupled to said local oscillator whereby a signal is produced at the output of said amplifier having an intermediate frequency equal to the difference between the photodetector output frequency and the local oscillator frequency, means coupled to said amplifier output for amplitude demodulating said intermediate frequency signal for generating said video signal, and means coupled to said demodulating means for recording said video signal.

* * * * *